(12) United States Patent
Holt et al.

(10) Patent No.: US 6,705,625 B2
(45) Date of Patent: Mar. 16, 2004

(54) CASTER ARRANGEMENT FOR USE ON ACCESS FLOORS

(75) Inventors: David Holt, Cols, OH (US); Gary A. Reichle, Dublin, OH (US)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 10/002,642

(22) Filed: Oct. 23, 2001

(65) Prior Publication Data

US 2002/0117822 A1 Aug. 29, 2002

Related U.S. Application Data

(60) Provisional application No. 60/244,003, filed on Oct. 27, 2000.

(51) Int. Cl.[7] .................................................. B62B 3/00
(52) U.S. Cl. ...................... 280/47.34; 280/79.3; 52/263
(58) Field of Search ........................... 280/47.34, 47.35, 280/79.2, 79.3, 79.7; 16/45; 180/22; 52/220.2, 263

(56) References Cited

U.S. PATENT DOCUMENTS

| | | | | |
|---|---|---|---|---|
| 5,205,381 A | * | 4/1993 | Mehmen ...................... | 188/19 |
| 5,787,663 A | * | 8/1998 | Wehrmann .................... | 52/263 |
| 6,068,356 A | * | 5/2000 | Giuseppe ..................... | 312/290 |
| 6,206,385 B1 | * | 3/2001 | Kern et al. ............... | 280/47.35 |
| 6,256,952 B1 | * | 7/2001 | Fahy et al. ................... | 52/263 |

\* cited by examiner

Primary Examiner—Brian L. Johnson
Assistant Examiner—Christopher Bottorff
(74) Attorney, Agent, or Firm—Howrey Simon Arnold & White LLP

(57) ABSTRACT

A caster arrangement for cabinets used on access or raised floors of a computer room or the like. The caster arrangement allows for a small, heavy cabinet to be situated on the panels of the access floor without applying concentrated or ultimate loads on the panels that may exceed the design characteristics of the panel and access floor. The caster arrangement allows for at most three casters to apply load to a given panel while the cabinet is being moved or has an arbitrary orientation.

2 Claims, 6 Drawing Sheets

CASTER ARRANGEMENT FOR USE ON ACCESS FLOORS

CROSS-REFERENCE TO RELATED APPLICATIONS

This application claims the benefit of U.S. Provisional Patent Application Serial No. 60/244,003, filed on Oct. 27, 2000 and having the title "Caster Arrangement for Use on Access Floors" and naming David Holt, Kenneth M. Wagner, Kylam D. Doan, Ron Williams, James K. Martin, Randall Mathis and Mike Harper as inventors, which provisional application is hereby incorporated by reference in its entirety.

BACKGROUND OF THE INVENTION

1. Field of the Invention

The present invention relates generally to cabinets supported on casters and, more particularly to an arrangement for casters on cabinets for use on access or raised floors of a computer room or the like.

2. Relation to Prior Art

As the computer and communication needs of business increase, computer or equipment rooms require flexibility and wire management. These rooms must allow for repair, rearrangement and upgrading of computer equipment and services. Increased data processing needs for the conventional office have been an increasing trend for businesses. Companies are anxious to create office environments that can be readily reconfigured with as little interference as possible to the fixed structure of the building. Many techniques exist for dealing with the large amounts of wiring required for computer and equipment rooms for the modern office. One such technique uses access flooring.

FIG. 1 illustrates an isometric view of an equipment cabinet 10 supported on a access floor 20 by a plurality of casters 12. The equipment cabinet may include computer or telecommunications devices or other equipment required to support such devices. A structural system of interchangeable floor panels 22 create access floor 20. Columns 24 support panels 22 at a specified height above raw floor 26 of the building. There are many types of access floors and panels, including welded steel panels having hollow or filled core. Most access floors are made of steel or aluminum.

Columns 24 vary in height typically from 6 to 30 inches. Several systems may be used to support or sustain the panels on the columns. For example, the panels may be held on the columns by gravity, snaps, bolts or locks. In addition, stringers or bars that run from column to column in the grid may provide additional support.

Access panels 22 create a plenum 28 below access floor 20. Wiring (not shown) may be distributed in plenum 28 between raw floor 26 and access floor 20. By removing interchangeable panels 21, one can access the wiring contained within plenum 28. In plenum 28, the electrical wiring can be economically installed. The plenum can also be used to deliver conditioned air.

To properly accommodate and handle heavy equipment and loads, the access floor and panels are built to various weight and strength specifications. The floors must be able to handle static loads and rolling loads. Equipment having common commercial casters for support and rolling can deform the access floor system or even cause the flooring to fail.

For example, Table I below illustrates criteria for an access floor system using steel panels held by gravity and stringers. The floor panel can support a concentrated load of 1000 lbs. and an ultimate load of 2100 lbs. The rolling loads allowable for a minimum deformation (0.040 inches) of the panels is about 400 lbs. for up to 10,000 passes. The values presented are for a commercial access floor as provided by the "All Steel 1000 System" from Tate Access Floors, Inc.

TABLE 1

| Panel | Understructure | Concentrated Load | Ultimate Load | Rolling Load |
|---|---|---|---|---|
| Steel | Stringerless-Gravity Held Panels | 1000 Lbs. | 2100 Lbs. | 400 Lbs. |

FIGS. 2A–B illustrate prior art caster arrangements. A portion of access floor 30 is shown from above. Three rows 32, 34, 36 of access panels and three columns A, B, C create the grid of the present portion of access floor 30. The panels are typically square and have a side length of one or two feet. The panels are arranged in a grid as shown. An outline of a cabinet 40 lies within the portion of access floor 30 and represents the location of an equipment cabinet 40 on the floor. Cabinet 40 has a plurality of casters 41–49 arranged under the cabinet to provide support and rolling of the cabinet on access floor 30.

For the present discussion, example dimensions and values will be used to illustrate and describe the arrangement of casters and loads for FIG. 2A. The access panels that compose access floor have a side length of 24 inches and have performance criteria as shown in Table 1. Cabinet 40 has a width W of 54" and a depth D of 33". Assuming that cabinet 40 holds equipment that creates a uniform load weighing 4500 lbs., each of the casters 41–49 supports a weight of 500 lbs.

From Table 1, each panel of access floor 40 can sustain a recommended concentrated load of 1000 lbs. and an ultimate load of 2100 lbs. With the arrangement of the nine casters 41–49 to support cabinet 40 of 54"×33", the weight can be properly distributed to the various panels as the cabinet rests or rolls on access floor 30. For instance, panel 34A supports weight of cabinet 40 through casters 41 and 44. If each caster 41 and 44 applies a concentrated load of 500 lbs. each, then the panel 34A supports an ultimate load of 1000 lbs. and falls within the performance criteria of Table 1. In particular, the concentrated load, i.e., the point load from a single caster, applied to panel 34A does not exceed the 1000 lbs. limit. Also, the combined static load of casters 41 and 44 being 1000 lbs. does not exceed the ultimate load of the panel of 2100 lbs. in Table 1.

Similarly, panel 34B supports casters 42 and 45 having 1000 lbs. of static load, and panel 34C supports casters 43 and 46 having 1000 lbs. of static load. Furthermore, panels 36A, 36B and 36C each support a single caster having static loads of 500 lbs. In this arrangement then, the casters properly distribute weight of the cabinet to the panels of the access floor. Importantly, no matter how the cabinet is ultimately situated on the access floor differently than depicted in FIG. 2A, a given panel will support at most only the static load of two casters.

FIG. 2B shows another caster arrangement according to the prior art. Cabinet 50 has similar dimensions as the cabinet described in FIG. 2A. Specifically, width W is 54 inches, and depth D is 33 inches. Six casters 51–56 support cabinet 50. If the cabinet uniformly weighs 4500 lbs. as before, each caster applies a concentrated load of 750 lbs. on a panel of access floor 30. With the present arrangement of six casters 51–56 for cabinet 50 on access floor 30, each panel supports the load of only one caster for any given orientation or roll of the cabinet.

Given the panel side length of 24 inches and the performance criteria of Table 1, access floor 30 in FIGS. 2A and 2B can properly accommodate a 4500 lbs. cabinet having the dimensions of 54" width and 33" depth and nine or six casters distributed uniformly below the cabinet. With the present trends, the computer and telecommunications industries design electrical components smaller and more compact. More equipment is being used by businesses and placed in more restrictive environments and computer rooms. These trends develop a growing need for more compact cabinets for containing a significant amount of equipment. Present caster arrangements if used with smaller cabinets results in problems and failures with respect to the access floor systems used in many data centers and computer rooms. For this reason, a need exists for a caster arrangement for more compact and densely equipped cabinets that will not overburden access floor systems.

The present invention is directed to overcoming, or at least reducing the effects of, one or more of the problems set forth above.

SUMMARY OF THE INVENTION

In view of the foregoing and other considerations, the present invention relates to an arrangement for casters on cabinets having electronic equipment for use on access or raised floors of a computer room or the like.

In accordance with one aspect of the present invention, there is provided a method for arranging casters to support a cabinet on an access floor. The access floor has a plurality of panels having a side length S. The cabinet is a right quadrangle having side lengths of W and D. The method includes establishing four corner casters on the corners of the right quadrangle. The method includes establishing a plurality of casters along sides W of the cabinet by spacing the plurality of casters at a distance of approximately $$\left(\frac{214}{240}\right)S$$

from one another. The method includes establishing a plurality of casters along sides D of the cabinet by spacing the plurality of casters a distance of at least $$\sqrt{2}S - \left(\frac{214}{240}\right)S$$

form one another. Maintaining each of the casters a minimum distance from the sides of the right quadrangle cabinet to which the casters lie adjacent ensures the stability of the cabinet. The sides W are each at least twice the distance $$\sqrt{2}S - \left(\frac{214}{240}\right)S,$$

and the sides D are each at least twice the distance $$\left(\frac{214}{240}\right)S.$$

BRIEF DESCRIPTION OF THE DRAWINGS

The foregoing, preferred embodiment and other aspects of the present invention will be best understood with reference to a detailed description of specific embodiments of the invention, which follows, when read in conjunction with the accompanying drawings, in which.

Figure 1:
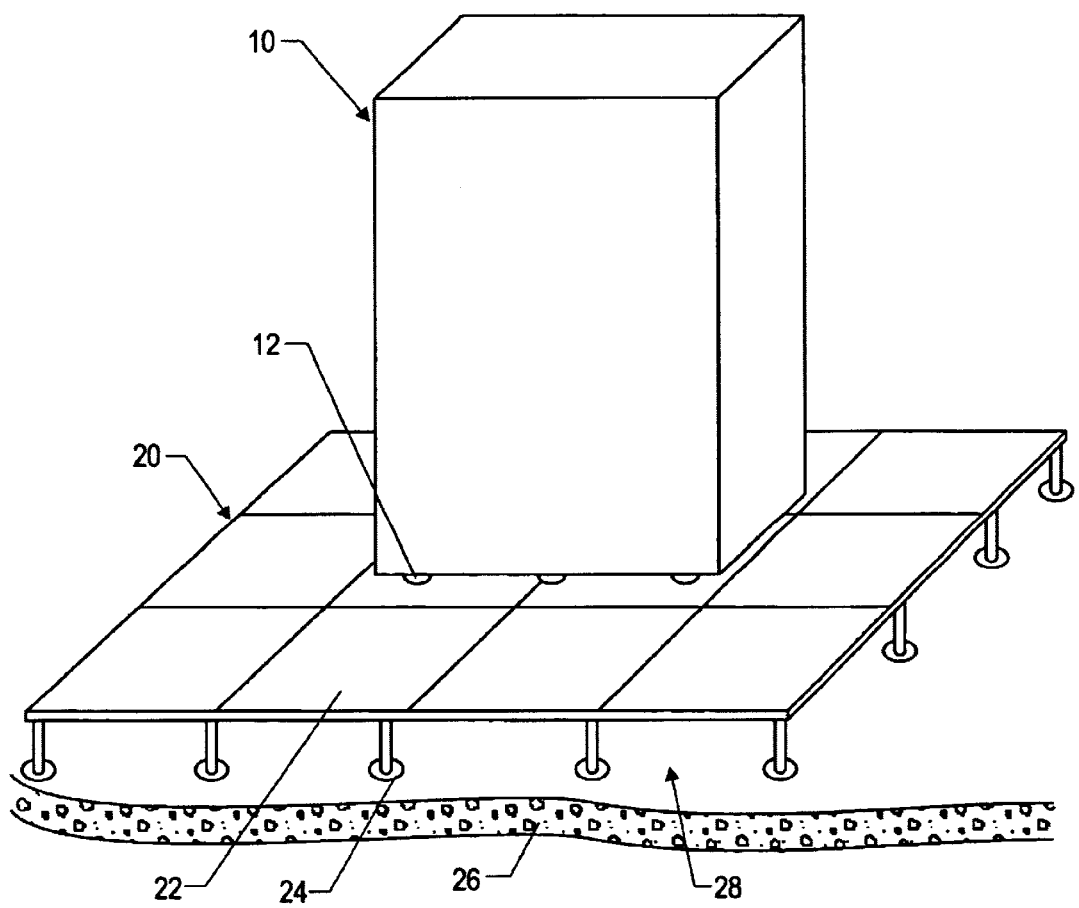
FIG. 1 illustrates an isometric view of a cabinet supported on an access floor.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modification, equivalents and alternatives falling within the scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nonetheless be a routine undertaking for those of ordinary skill in the art having the benefit of this disclosure.

Figure 3:
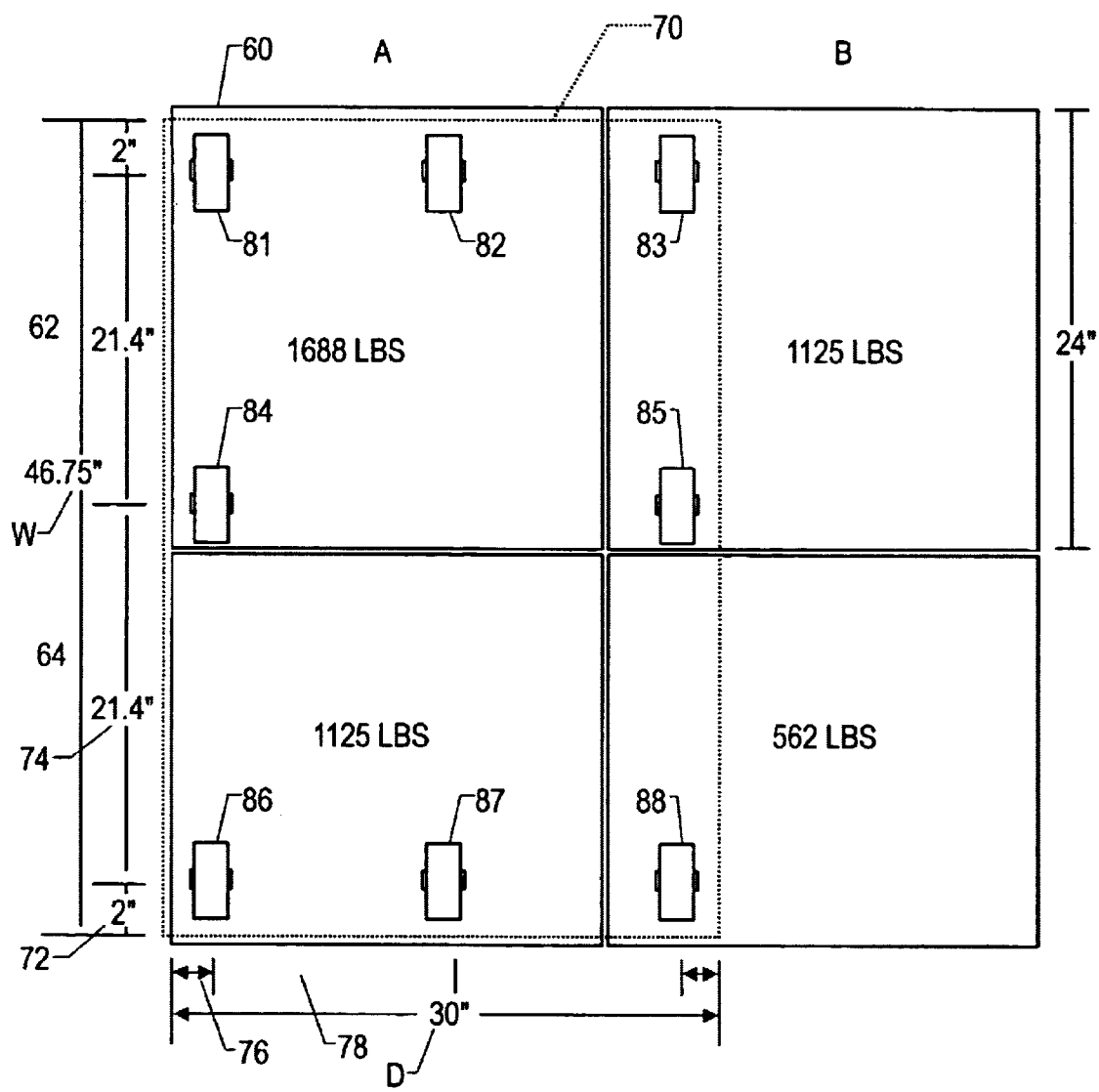
FIG. 3 illustrates a caster arrangement in relation to various panel orientations according to the present invention.

FIG. 3 illustrate a caster arrangement according to the present invention. FIG. 3 shows a top view of a four-panel portion of an access floor 60. The panels form a grid and are situated by rows 62, 64 and columns A, B. For the present discussion, the sides of the panels have a dimension of 24 inches, which is a conventional size for access floor panels. Also, the panels will be discussed with the exemplary performance criteria as first discussed in Table 1, which represents a commercial access floor with common stability characteristics. It is to be understood that dimensions and values provided in the present discussion will vary in accordance with different dimensions or performance criteria for other access floors. Such variations can be properly considered by one of ordinary skill in the art when applying the present invention to a particular design situation.

Figure 2A:
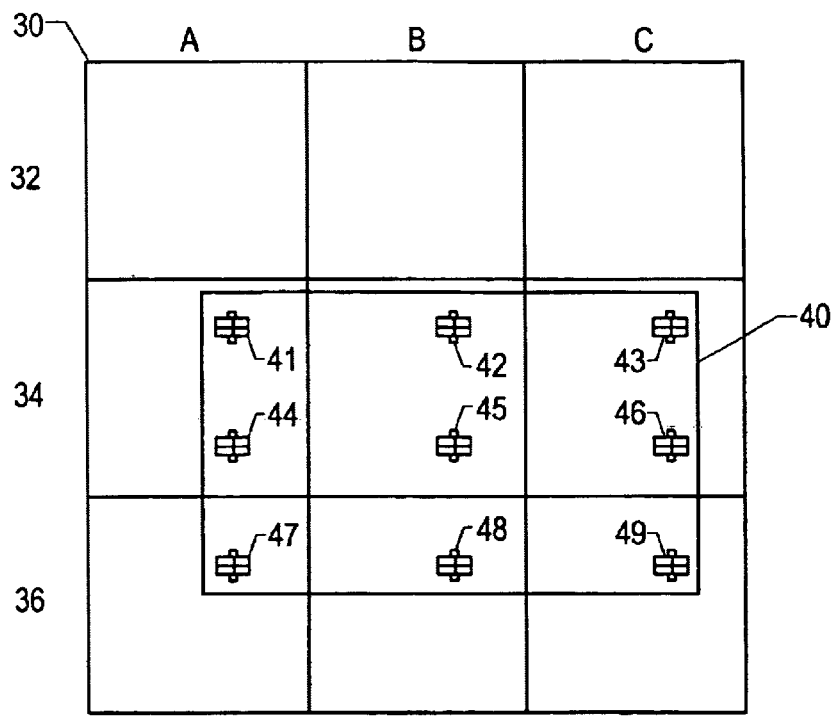
FIGS. 2A–B illustrate prior art caster and cabinet arrangements.
Figure 2B:
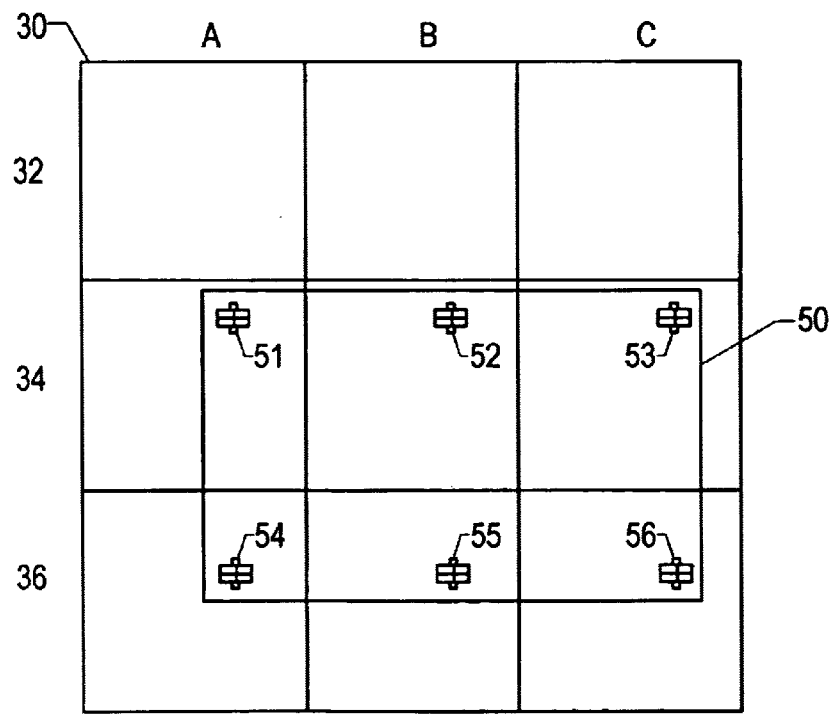

An outline of a cabinet 70 is depicted as the cabinet would rest on access floor 60. The cabinet applies weight to the floor with a plurality of casters 81–88. Unlike the cabinet described in FIGS. 2A–B, cabinet 70 has a width W of 46.75 inches and a depth D of 30 inches, giving cabinet 70 a cross-sectional area of 1402.5 square inches with which to distribute weight to access floor 60. The cabinet in FIGS. 2A–B had a cross-sectional area of 1782 square inches. Therefore, the present cabinet 70 has a decrease in cross-sectional area of roughly 21% with which to apply its weight to a similar access floor.

As noted, trends in the computer industry produce smaller components. As a result, cabinet 70 may contain as much equipment as the larger cabinet described in the prior art of FIGS. 2A–B. Therefore, cabinet 70 may also weigh 4500 lbs.

Assuming that cabinet 70 weighs 4500 lbs. distributed evenly, the weight then must be applied to four panels 62A–B and 64A–B. Eight casters 81–88 support the weight of cabinet 70. Each caster applies a static point load of 562.5 lbs. to the access floor 60, considering that the wheel of the caster has relatively small dimensions and acts as a point load on the panels. Recall from Table 1 that the concentrated load for an exemplary panel cannot exceed 1000 lbs. at any one point of a panel and that the ultimate load of a panel is 2100 lbs.

Casters 81–88 are arranged as follows on the bottom of cabinet 70. The corner casters 81, 83, 86 and 88 are situated a distance 72 within the width W of cabinet 70. Distance 72 is two inches for the present cabinet and panel dimensions. Also, corner casters 81, 83, 86 and 88 are situated a distance 76 within the depth D of cabinet 70. Distance 76 is also two inches for the present cabinet and panel dimensions.

Caster 82 is centered between casters 81 and 83, lies distance 72 within the width W, and is located distance 78 from both caster 81 and 83. Likewise, caster 87 is centered between casters 86 and 88, lies distance 72 within the width W, and is located distance 78 from both caster 86 and 88. The distance 78 is equal to half of the value of the depth D of cabinet 70 minus twice the distance 76. In other words, distance 78 is approximately 13 inches for the present dimensions.

Caster 84 is centered between casters 81 and 86, lies distance 76 within the depth D, and is located distance 74 from both caster 81 and 86. Likewise, caster 85 is centered between casters 83 and 88, lies distance 76 within the depth D, and is located distance 74 from both caster 83 and 88. The distance 76 is equal to half of the value of the width W of cabinet 70 minus twice the distance 72. In other words, distance 74 is 21.4 inches for the present dimensions.

With the arrangement of casters described above, panel 62A has a static load of 1687.5 lbs. from casters 81, 82, 84. Panel 62B has a static load of 1125 lbs. from casters 83 and 85. Panel 64A has a static load of 1125 lbs. from casters 86 and 87. Panel 64B has a static load of 562.5 lbs. from caster 88. The access floor 60 and panels properly supports the smaller and densely equipped cabinet 70.

Although the orientation of cabinet 70 in FIG. 3 with respect to access floor 60 presents a singular alignment of the cabinet with the grid of panels, FIGS. 4A–D illustrate the caster arrangement and cabinet 70 in various positions relative to access floor 60. FIGS. 4A–D illustrate that the present invention allows cabinet 70 with the caster arrangement according to the present invention to be arbitrarily situated on access floor 60 without exceeding the performance and ultimate loading of the access floor and panels.

When a small, heavy cabinet such as that described in the present discussion is first installed into a computer room having an access floor, failure may occur as the cabinet is situated on the panels if the casters and cabinet apply to much load to the panels. Also, during installation, maintenance or rearrangement, the orientation and rolling of the cabinet should not apply improper loads to the access floor of the computer room.

Therefore, as FIGS. 4A–D show, the present invention properly applies the load of the small, heavy cabinet on the access floor so that failure may be avoided due to the arbitrary orientation or rolling of the cabinet on the access floor. In particular, with any arbitrary orientation, a given access panel will receive at most the load of three casters totaling a static load of 1687.5 lbs.

Figure 4A:
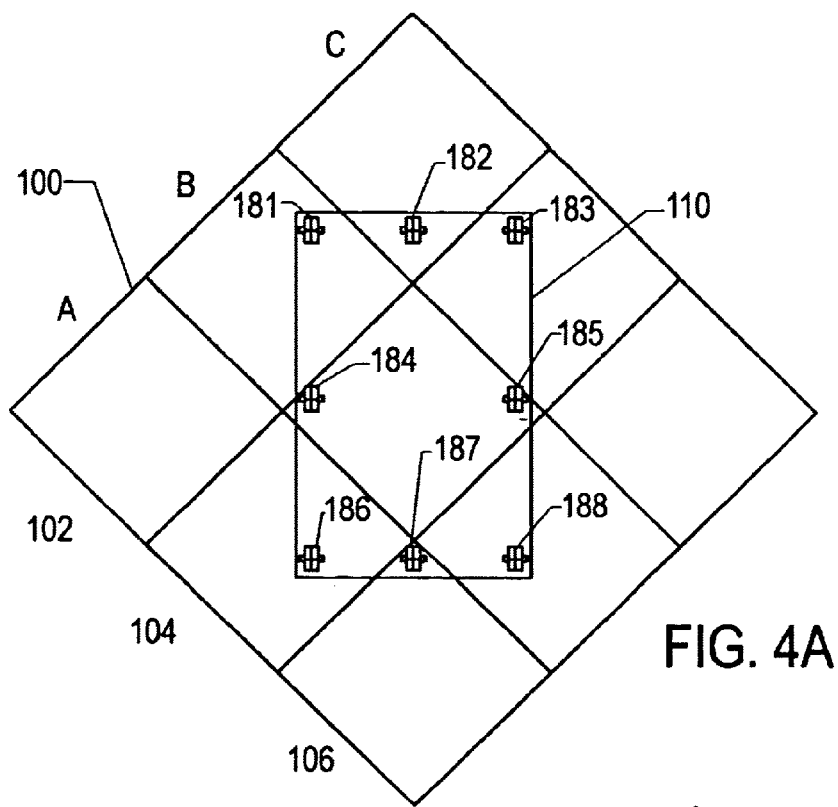
FIGS. 4A–D illustrate the caster arrangement in various positions in relation to the access floor and panels.

FIG. 4A shows a top view of portion of an access floor 100 forming a grid of nine panels. The outline of a cabinet 110 with the dimensional characteristics as previously described is arbitrarily situated on access floor 100. The cabinet has eight casters 181–188 that have the similar dimensional arrangement as described previously. Each of the panels 102B–C, 104A–C, and 106A–B supports only the concentrated load of 562.5 lbs. for one caster.

Figure 4B:
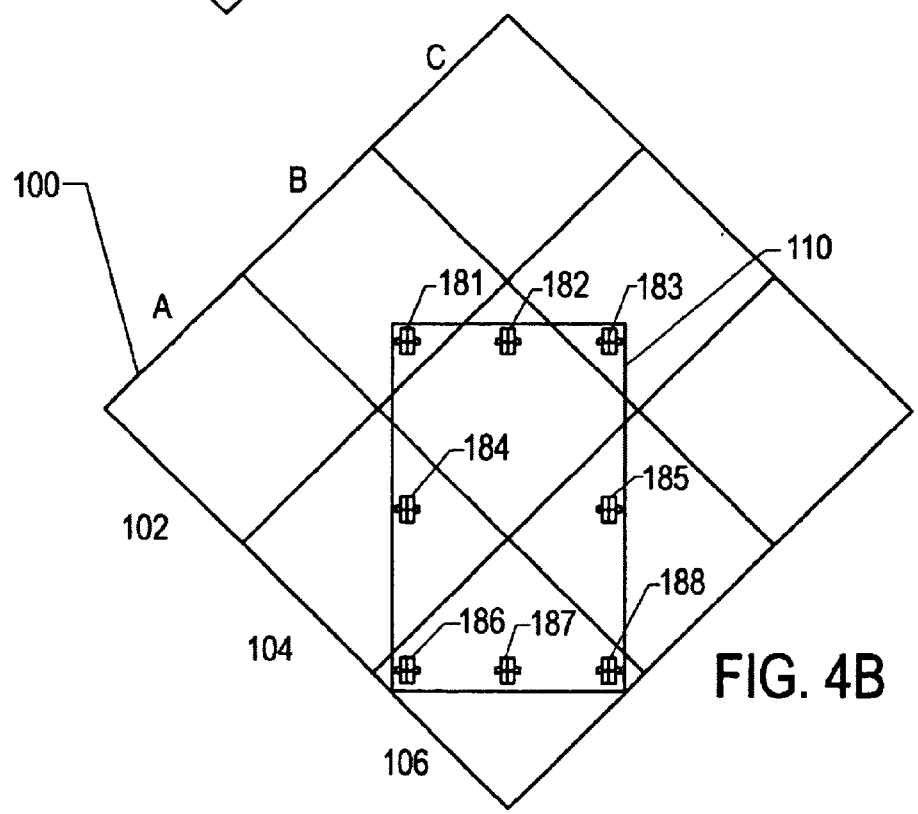

FIG. 4B shows cabinet 110 in a second, arbitrary orientation relative to access floor 100, as if the cabinet is being moved or has been repositioned on the access floor. Each of the panels 102B, 104A–C, and 106B supports only the concentrated load of 562.5 lbs. from one caster. Panel 106A supports three casters 186, 187, 188 having a combined load of 1687.5 lbs. Thus, cabinet 110 and casters 181–188 do not exceed the performance criteria of the access floor.

Figure 4C:
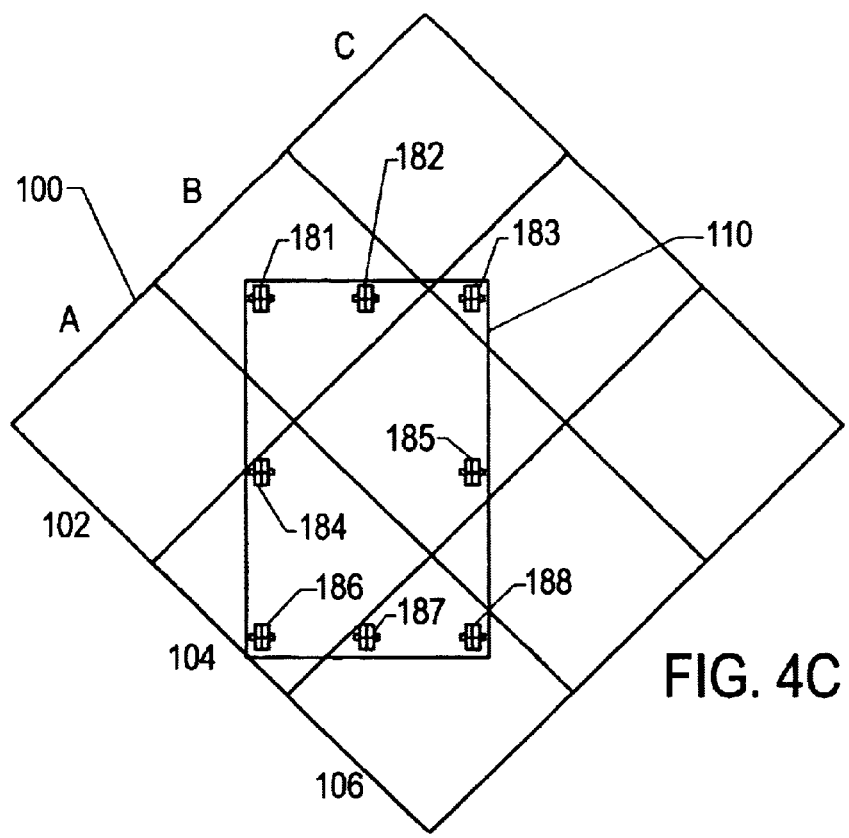

FIG. 4C shows cabinet 110 in another arbitrary orientation relative to access floor 100, as if the cabinet is being moved or has been repositioned on the access floor. Panels 104B and 104C support only the concentrated load of one caster having a load of 562.5 lbs. Panels 102B, 104A and 106A supports two casters each having a combined load of 1128 lbs. Thus, cabinet 110 and casters 181–188 do not exceed the performance criteria of the access floor.

Figure 4D:
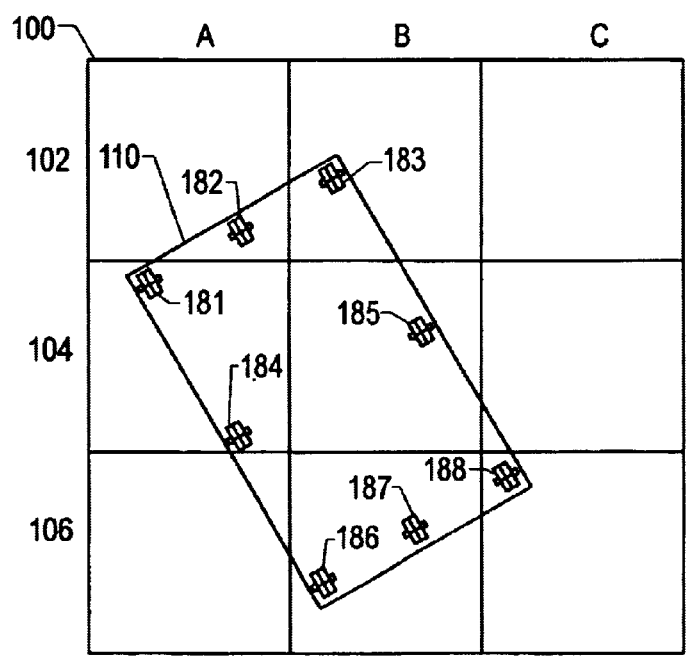

Lastly, FIG. 4D shows cabinet 110 in yet another arbitrary orientation relative to access floor 100, as if the cabinet is being moved or has been repositioned on the access floor. Panels 102A, 102B, 104B and 106C support only the concentrated load of one caster having a load of 562.5 lbs. Panels 104A and 106B supports two casters each having a combined load of 1128 lbs. Thus, cabinet 110 and casters 181–188 do not exceed the performance criteria of the access floor.

FIGS. 4A–D help to illustrate various arbitrary orientations for the cabinet and casters. It will become obvious under further inspection that any orientation of the cabinet and caster arrangement according to the present invention will result in no more than the load of three casters being applied to any one panel at one time.

Figure 5A:
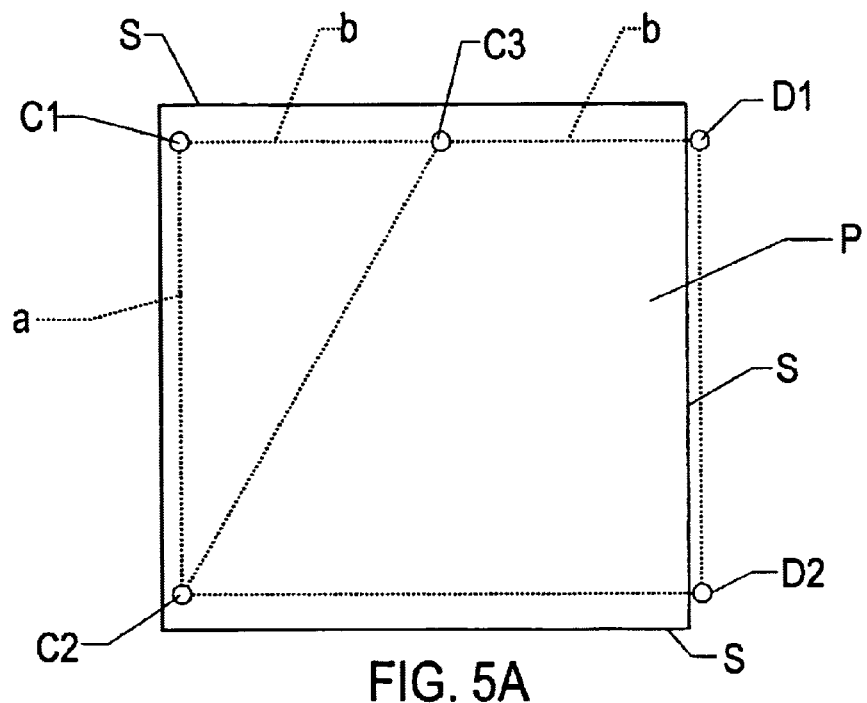
FIGS. 5A–B presents a method for determining the caster arrangement according to the present invention.
Figure 5B:
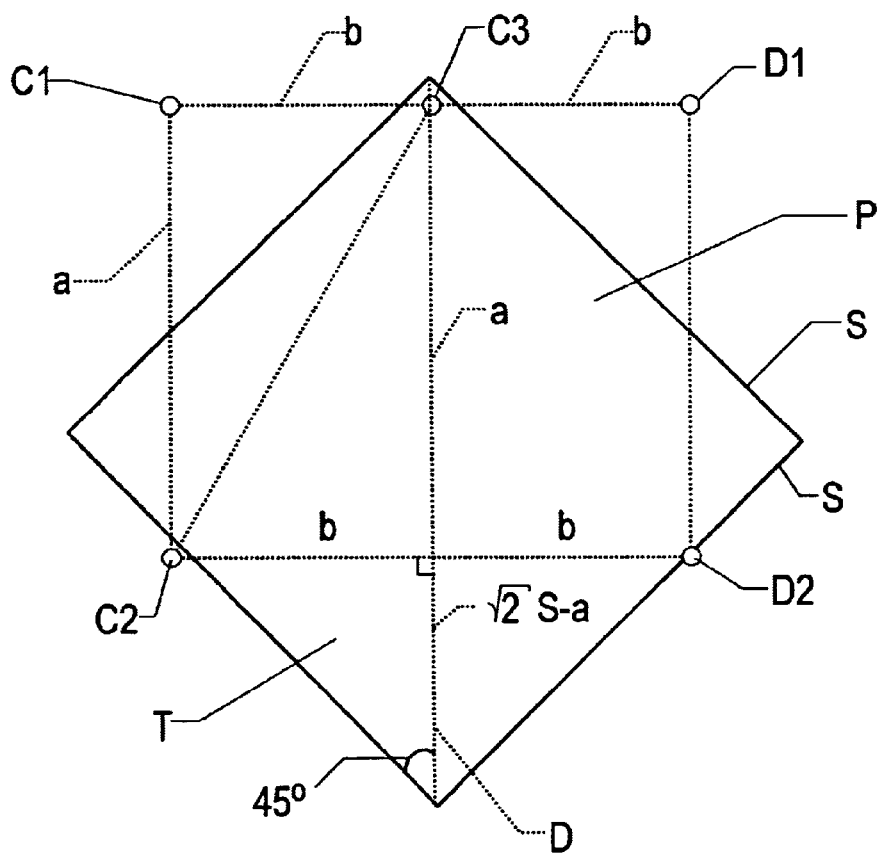

FIGS. 5A–B present a method for determining the caster arrangement for an access floor with panels of any given size. Referring to FIG. 5A, an arbitrary panel for a raised floor having a side length S is shown in bold line. A corner caster arrangement of casters C1, C2 and C3 is shown relative to the panel P. The corner caster arrangement is understood to represent only part of the casters required to support a cabinet. The cabinet would require four such caster arrangements at each corner with additional casters placed between the corners as necessitated by the total width and depth of the cabinet.

It is desired that only three casters rest on a panel for a given orientation. All three casters C1–C3 rest on panel P of side length S. It is determined by inspection that the distance a, between casters C1 and C2, is ideally less than length S, but greater than S/2. If distance a where to be greater than S, fewer casters would be used to distribute the load of a cabinet. Each caster would then support a higher static load, in which case the applied force of two or even one caster may exceed the criteria of the access floor. If distance a where to be less than S/2, more than three casters would clearly lie on panel P.

The distance b, between casters C1 and C3, must be greater than S/2. If b is less than half the length of S, then a fourth caster D1 will also rest on the panel if the casters are used on a relatively compact cabinet with the casters situated evenly. Also, if the cabinet that the casters support requires a second corner arrangement made up of casters D1, D2 and C3, then caster D2 would also lie on the panel if b were to be less than S/2.

FIG. 5B illustrates the corner arrangement of casters C1, C2 and C3 in relation to the panel P having a side length S. Panel P is shown skewed at 45° to help in further refining the distances of a and b in terms of the given length S of panel P. Caster C2 rests on one corner of the panel of side length S. It is desired that caster C3 also just rest on the edge of the panel, due to the stipulation that no more than three casters rest on panel P for any orientation. For panel length S in skewed and aligned positions, it is emperically determined that length a may be provided by the relation:

$$a \cong \frac{214}{240}S$$

The length D, from corner to corner of the square panel P, is given by $$D=\sqrt{2}S$$

With caster C3 on the edge of panel P, then triangle T is an isosceles triangle, having the equal sides of ($\sqrt{2}S-a$). Therefore, the length b may be obtained by:

$$b \cong \sqrt{2}S-a$$

$$\therefore b \cong \sqrt{2}S - \frac{214}{240}S$$

For example, if a panel side length is provided to be S=12 inches, length a for corner arrangement should be approximately 10.7 inches. Length b should be approximately 6.3 inches. It is understood that the corner casters of C1, C2 and C3, in order to provide stability, should not be situated far from the edges of the cabinet that they are used to support. For example, the casters may be situated a distance of 2 inches from the edge of the cabinet. Therefore, the caster arrangement is appropriate where the arrangement of the casters supports a cabinet that does not overly exceed the requirements for stability.

While the invention has been described with reference to the preferred embodiments, obvious modifications and alterations are possible by those skilled in the related art. Therefore, it is intended that the invention include all such modifications and alterations to the full extent that they come within the scope of the following claims or the equivalents thereof.

What is claimed is:

1. A method for arranging casters on a cabinet to support a load in the cabinet on an access floor, the access floor having a plurality of panels with each panel having a side length S, the method comprising:

designing the cabinet with first and second sides with the length of each of the first and second sides being at least twice a distance a, wherein S/2<a<S;

designing the cabinet with third and fourth sides with the length of each of the third and fourth sides being at least twice a distance b, wherein b>$\sqrt{2}S$-a;

placing four corner casters on each corner of the cabinet;

placing casters along each of the first and second sides of the cabinet at the distance b from one another and from adjacent corner casters; and placing casters along each of third and fourth sides of the cabinet at the distance b from one another and from adjacent corner casters, whereby three or less of the casters distribute the load of the cabinet to any one panel of the access floor at any given orientation of the cabinet.

2. The method of claim 1, wherein the distance a is approximately $$\left(\frac{214}{240}\right)S$$

so that b is approximately $$\sqrt{2}S - \left(\frac{214}{240}\right)S.$$

* * * * *

UNITED STATES PATENT AND TRADEMARK OFFICE
CERTIFICATE OF CORRECTION

PATENT NO.    : 6,705,625 B2
DATED         : March 16, 2004
INVENTOR(S)   : Daivd Holt and Gary A. Reichle It is certified that error appears in the above-identified patent and that said Letters Patent is hereby corrected as shown below:

Column 8,
Line 18, delete $\overline{\sqrt{2s}}$ and insert therefor -- $\sqrt{2}\,\underline{s}$ --.

Line 22, delete "b" and insert -- a --.

Signed and Sealed this

Third Day of August, 2004

JON W. DUDAS
*Acting Director of the United States Patent and Trademark Office*